March 26, 1946.  V. JORGENSEN  2,397,420
POWER DRIVEN CONVEYER
Filed April 5, 1945  2 Sheets-Sheet 1
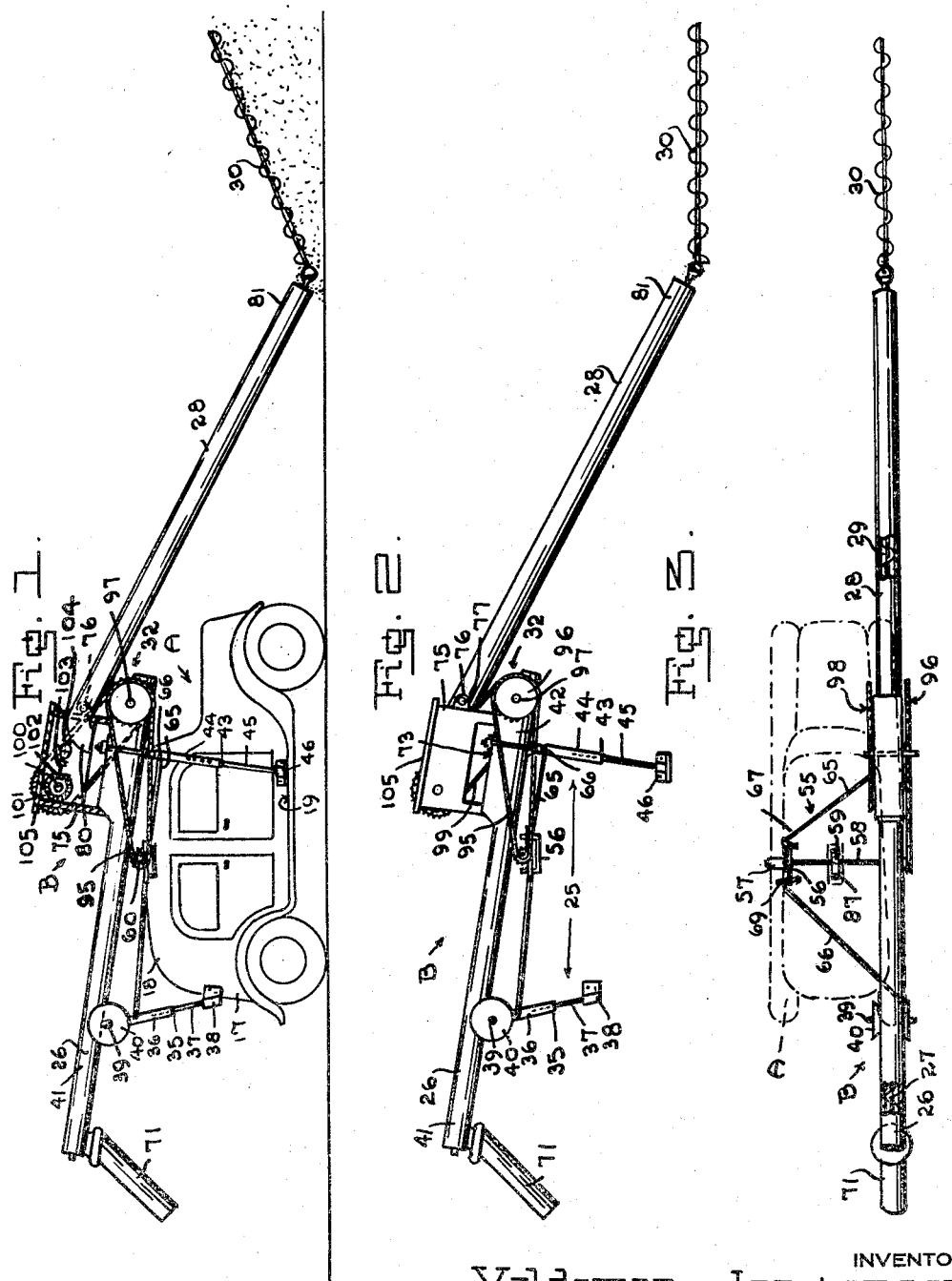
INVENTOR.
Valdemar Jorgensen
BY
ATTORNEYS.

March 26, 1946. V. JORGENSEN 2,397,420
POWER DRIVEN CONVEYER
Filed April 5, 1945 2 Sheets-Sheet 2
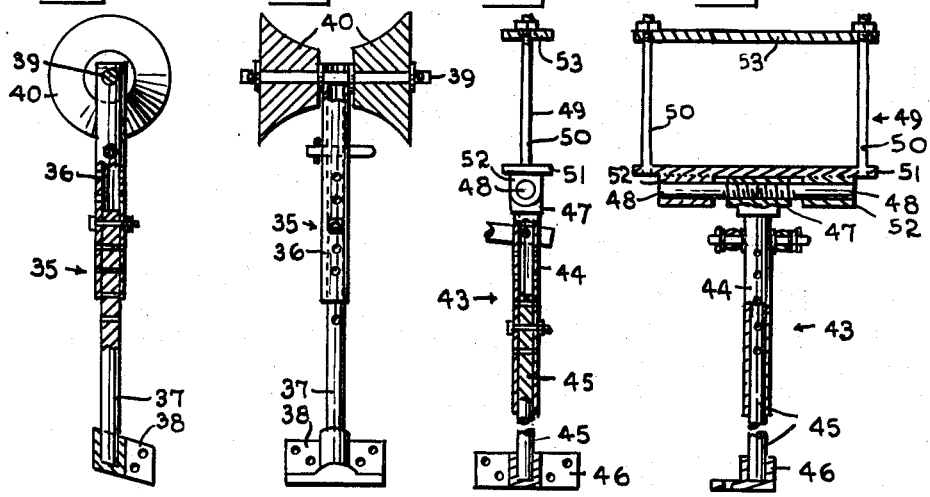
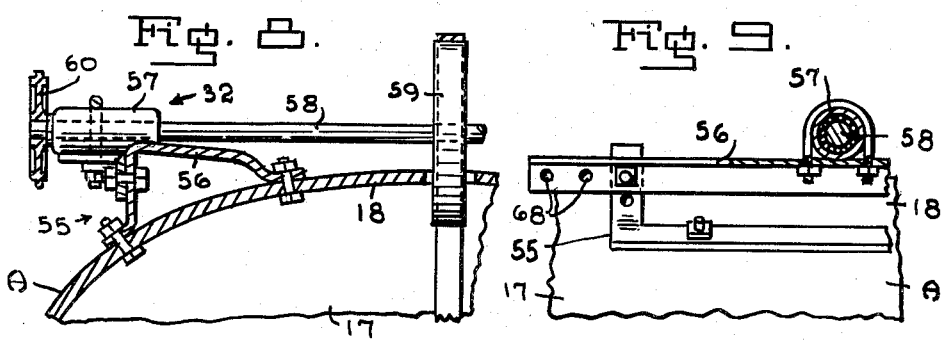
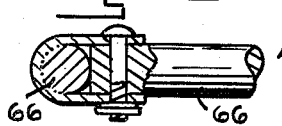
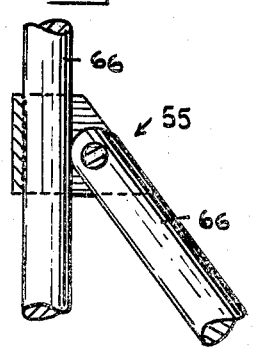
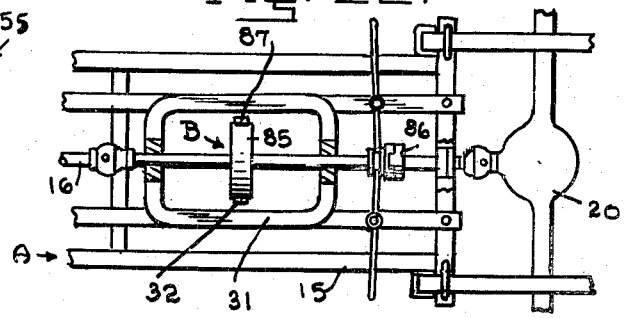
INVENTOR.
Valdemar Jorgensen
BY Lancaster, Allwine and Rommel
ATTORNEYS.

Patented Mar. 26, 1946

2,397,420

UNITED STATES PATENT OFFICE 2,397,420

POWER-DRIVEN CONVEYER

Valdemar Jorgensen, Cordova, Nebr.

Application April 5, 1945, Serial No. 586,678

8 Claims. (Cl. 198—7)

This invention relates to power-driven conveyers and more particularly to loading machine type power-driven conveyers.

An important object of the invention is to provide a power-driven conveyer so compact, light weight and well balanced that it may be mounted upon a suitable vehicle, such as a conventional touring car type automobile, employing the motive power of the automobile for its operation and, when so mounted, the unit may be moved from place to place in order to load grain, and other similar materials from piles, banks, beds and the like, with the materials above or below the ground level of the unit. That is, the materials may be in piles on the ground level of the conveyer, in bins, truck bodies, beds below the ground level of the unit, or in banks above this ground level.

Another important object is to provide a conveyer as stated above, which is so positioned, with respect to the vehicle upon which it is mounted, that the vehicle does not become top-heavy, even when the conveyer is in operation.

Still another major object is to provide such a conveyer, mounted as stated, which may be moved into various positions, such as cramped locations and positions where the conveyer may first load a truck with material from a pile, follow the loaded truck to an elevated bin and fill the bin from the truck.

Other objects and advantages of the invention will be apparent during the following detailed description of the invention, taken in connection with the accompanying drawings, forming a part of this specification, and in which drawings Fig. 1 is a side elevation of the novel power driven conveyer, mounted upon an automobile body.

Fig. 2 is a side elevation of the conveyer removed therefrom.

Fig. 3 is a top plan of the conveyer of Fig. 2, with the automobile of Fig. 1 shown in dots and dashes.

Fig. 4 is an end elevation and Fig. 5 a side elevation of a rear support member for the conveyer.

Fig. 6 is an end elevation and Fig. 7 a side elevation of a front support member for the conveyer.

Fig. 8 is a partly side elevation and partly vertical transverse section of a bracket and associated portions of the conveyer.

Fig. 9 is a fragmentary (one end) elevation of the bracket of Fig. 8.

Figs. 10 and 11 are fragmentary sectional views of bracing means associated with the support members of Figs. 4 to 7.

Fig. 12 is a fragmentary top plan view of a power take-off employed in the novel conveyer assembly.

In the drawings, wherein for the purpose of illustration is shown a preferred embodiment of the invention and wherein similar reference characters designate corresponding parts thruout the several views, the letter A designates a vehicle upon which is mounted the novel conveyer B.

The vehicle A is shown as a sedan-type automobile having a chassis 15, transmission 16, body or tonneau 17, having a roof 18, running boards or their equivalent 19 and differential 20.

As for the novel conveyer B, the same includes an adjustable support structure 25, a first conveyer housing 26, enclosing a first screw conveyer 27, a second conveyer housing 28, enclosing a second screw conveyer 29, one or more houseless conveyers 30, power take-off means 31 and drive means 32 between the power take-off means 31 and conveyers 27, 29 and 30.

The adjustable support structure 25 shown particularly in Figs. 4 and 5, includes a telescoping rear upright support member 35, comprising sections 36 and 37 with the lower section 37, which may be tubular, supported by a bracket 38 secured to the vehicle body 17 in any approved way, as by bolts or screws entering the rear end of the body structure, and the upper section 36, which may also be tubular and slidable over the section 37, supporting a substantially horizontal axle 39 upon which rotates a roller 40 having a periphery concave in transverse cross section. The two sections 36 and 37 may be held in any desired telescopic relationship as by bolts passing through, aligning perforations in the two sections. The roller 40 is adapted to support one end 41 of the first conveyer housing 26 with the housing accommodated in the concavity of the roller. That is, the housing 26 is so supported that, as the support member 35 is raised or lowered, the roller 40 will rotate in either direction over the surface of this end of the first conveyer housing, and binding of support member and housing 26 will be eliminated, as is now apparent.

The opposite end 42 of the first conveyer housing 26 is preferably supported by a somewhat like telescoping front upright support member 43, shown particularly in Figs. 6 and 7, comprising sections 44 and 45 with the lower section 45, which may be tubular, supported upon one running board 19 (as the right-hand running board) or similarly located structure of the vehicle A. At its lower end, this section 45 may be carried by a suitable bracket 46. The upper section 44, which may also be tubular and telescope over the section 45, carries, at its upper end, a T-coupling 47 from the opposite ends of which extend short lengths of horizontally-disposed rods or tubes 48. Supported by the rods or tubes 48 is a yoke 49 adapted to couple together the first conveyer housing 26 and the telescoping front upright support member 43. It is desirable that such a yoke be employed, and this yoke may include a pair of spaced apart uprights 50 rigidly carried by a horizontal member 51 welded or otherwise secured to sleeves 52 extending about the rods 48. The upper ends of the uprights 50 may be provided with screw threads, for cooperating nuts bearing against a second horizontal member 53 which has perforations to slidably receive the rods 48 and rest upon the upper surface of the first conveyer housing 26, against which it may be clamped. This provides a means whereby the telescoping front upright support member 43 may be raised or lowered without binding the housing supported by it, since the clamping action may be temporarily released but the housing 26 cannot slip transversely from the yoke 49 because of the uprights 50, while the housing 26 rests upon the horizontal member 51.

In order that the two support members 35 and 43 may be rigidly retained upright and properly braced to support their loads, a cross bracing structure 55 comprises a part of the support structure 25 and dually functions to carry a portion of the drive means 32. This is shown particularly in Figs. 3, 8, 9 and includes a pair of brackets 56 adapted to be secured, as by screws or nuts and bolts, at adjacent the upper end of the vehicle body 17, intermediate its ends and substantially equally spaced and near its sides. Each bracket 56 carries a bearing structure 57, supporting, through the intermediary of ball or roller bearings, a shaft 58 to which is keyed or otherwise secured, intermediate its length, a pulley 59 and, close adjacent one end, outwardly of one bearing structure 57 and clear of the vertical planes of the vehicle A, a sprocket 60. The sprocket 60 is operatively connected with the remainder of the drive means 32 and the pulley 59 is operatively connected with the power take-off means 31, both means to be subsequently described.

Joining the brackets 56 and support members 35 and 43, are a plurality of tie-rods 65 and 66. There are two tie-rods 65 which extend forwardly, one from each bracket 56 to the section 44 of the support member 43 but, since this support member extends upwardly from one running board (or one side) of the vehicle A, and the brackets 56 are disposed near the sides of the vehicle, one of the two forwardly-extending tie rods 65 substantially parallels the longitudinal axis of the vehicle A, while the other extends diagonally over the top of the body 17. The two forwardly-extending rods 65 may be rotatably secured to the support member 43 as by pivot pins and are, preferably, rotatively and adjustably supported by the brackets 56. This is accomplished by fashioning the bracket-engaging ends 67 of the rods J-shaped with these ends 67 extending through any of several spaced-apart perforations 68 in the walls of brackets 56 and cotter pins or the like may be employed to detachably couple the rods and brackets together.

There are also two tie rods 66 extending from the brackets 56 to the support member 35, and the rearward end of one of these rods 66 may be rotatably secured in any approved way to the upper end of the support member 35, while the rearward end of the other tie-rod 66 may be pivoted to the tie-rod 66 rotatably secured to the support member 35, as shown in Figs. 10 and 11. The forward ends of both tie rods 66 may be secured, as by pivot pins 69 extending through selected perforations 68 in the brackets 56. The two diagonally-extending tie rods 65 and 66 act as braces.

The first conveyer housing 26 is, preferably, of a length sufficient to extend to and over the roller 40, through the yoke 49 and outwardly beyond roller and yoke. The rearward end portion 41 of the housing 26 may terminate in a swingable spout 71 for the discharge of the material being handled and the opposite or front end portion 42 of the housing 26 carries part of the drive means 32. This end portion 42 may have an upwardly-opening mouth 73 to receive material discharged from the second conveyer housing 28. Obviously, the major portion of the housing 26 is preferably cylindrical since it houses the cylindrical screw conveyer 27. It will be noted in Fig. 1, that this housing 26 is so positioned that it slopes downwardly from back to front end portion 72 and this slope may be adjusted as described.

A support 75 for the rear end portion of the second conveyer housing 28 is provided and this may be mounted upon the front end portion 72 of the housing 26. This support also carries a part of the drive means 32. So that the housing 28 may be swung upwardly or downwardly to various angles, the support 75 may carry a pair of spaced-apart ears or brackets 76 through which extend removable pivot pins 77 carried by the rearward end of the housing 28.

The first and second screw conveyers 27 and 29 may be of conventional construction.

Extending upwardly from the ground or other lower surface is the housing 28 for the conveyer 29 with the extremity of its upper end portion 80 open for the discharge of material therefrom and into the mouth 73 of the housing 26. Of course the extremity of the lower end portion 81 is also open. This end portion 80 has openings, accommodating the pivot pins 77, whereby the housing 28 may be swung vertically into various positions, and by withdrawing the pivot pins 77 and uncoupling a part of the drive means, to be subsequently described, the housing 28 may be removed.

The third or houseless screw conveyer 30 may be secured, at its inner end, as by a conventional universal joint, to the lowermost end of the screw conveyer 29. Its function is well known, since it is adapted to be deposited at various angles, upon a pile of material or manually gradually moved laterally over a bed of the same and gradually move the material to the open end portion 81 of the housing 28, where it is then conveyed upwardly by the screw conveyer 27.

Any suitable power take-off means may be employed, whereby the motor of the vehicle A may be employed to operate the novel conveyer B. In the example shown, a pulley 85 and clutch 86 are interposed in the transmission 16, being mounted on the drive shaft between the motor and differential of the vehicle A, whereby the pulley 85 will rotate, upon disengagement of the clutch 86, without any operation of the differential.

From this pulley 85 extends a belt 87 to the pulley 59. Since these pulleys are disposed intermediate the transverse axis of the vehicle A, it is necessary to remove portions of the flooring and roof of the vehicle body so as to accommodate this belt 87. In fact, a portion of the upper pulley 59 extends below the top of the body 17 of the vehicle A. The belt 87 may pass upwardly just rearwardly of the front seat of the vehicle. Any suitable conventional belt-tightening means may be employed for the belt 87 in order to tighten the belt when it is desired to rotate the pulley 59 and loosen the belt when it is desired that the belt hang free of the pulley 85 so that the belt and pulley 59 will not operate.

The drive means 32 includes a sprocket chain 95 about the sprocket 60 and about a sprocket 96 mounted upon a shaft 97 carried by the first conveyer housing 26. This shaft 97 is operatively connected, as with conventional gearing (not shown), with the first conveyer 27 and with another sprocket 98, from which a sprocket chain 99 extends to and over a sprocket rotatably carried by the support 75, and mounted upon a shaft 100 carrying a gear 101 for operative connection, through a second gear 102 (meshing therewith), a shaft 103 and a universal joint 104 to the second conveyer 29. If desired, the gears 101 and 102, shaft 103 and universal joint 104 may be protected by a suitable housing 105 and, without invention, the shaft 103 may be in two parts, with a conventional means interposed for detachably coupling the two parts together. Any conventional means as a chain tightener, (not shown) may be used to compensate for any differences in distances, due to adjustments of the housing 26 with respect to the body 17, between the sprockets 60 and 96.

Disposed as is the conveyer B, the operating parts thereof are mostly to one side of the longitudinal medial line of the vehicle A and thus quite accessible. The belt 87 is out of the way (mostly within the vehicle body) and back of the front seat.

In order to detach the conveyer housings from the vehicle, all that is required is to remove the sprocket chain 95 and withdraw the sections 36 and 45 from their telescopic connection with the sections 37 and 46, and it is also now apparent that the housing 28 and the screw conveyer 29 may be detached from and reattached to the housing 26 and screw conveyer 27, for transportation, storage and the like.

Since the first conveyer housing 26 may be tilted at various angles (by manipulation of the telescoping upright support members 35 and 43 and cooperation therewith by the roller 40, yoke 49 and the pivoted tie rods 65), the rearward and forward end portions 41 and 42, respectively, of the housing 26 may be lowered or raised, which also lowers or raises the conveyer housing 28, as may be found more convenient for various loading operations.

Various changes may be made to the form of the invention herein shown and described without departing from the spirit of the invention or scope of the claims.

1. In a conveyer, adapted to be mounted upon a vehicle having a chassis and a tonneau, an upwardly-extending telescoping support; means to secure the lower end thereof to the outer face of said tonneau at an end thereof; a second upwardly-extending telescoping support; means to secure the lower end of said second support to said chassis, intermediate the ends thereof; a roller carried by said first support; a yoke carried by said second support; a conveyer housing having its rear end portion disposed upon said roller and its front end portion secured in said yoke; a conveyer mechanism in said housing; a second conveyer housing, pivotally connected to an end of said first conveyer housing and extending downwardly therefrom; a conveyer mechanism in said second housing; and means to operate said conveyers.

2. In a conveyer, adapted to be mounted upon a vehicle having a chassis and a tonneau, an upwardly-extending telescoping support; means to secure the lower end thereof to the outer face of said tonneau at an end thereof; a second upwardly-extending telescoping support; means to secure the lower end of said second support to said chassis, intermediate the ends thereof; a roller carried by said first support; a yoke carried by said second support; a pair of brackets secured to said tonneau adjacent the upper end thereof; braces extending from said brackets to said supports; a conveyer housing having its rear end portion disposed upon said roller and its front end portion secured in said yoke; a conveyer mechanism in said housing; a second conveyer housing, pivotally connected to an end of said first conveyer housing, and extending downwardly therefrom; a conveyer mechanism in said second housing; and means to operate said conveyers including a shaft rotatably supported by said brackets.

3. In a conveyer, adapted to be mounted upon a vehicle having a chassis and a tonneau, an upwardly-extending telescoping support; means to secure the lower end thereof to the outer face of said tonneau at an end thereof; a second upwardly-extending telescoping support; means to secure the lower end of said second support to said chassis, intermediate the ends thereof; a roller carried by said first support; a yoke carried by said second support; a pair of brackets secured to said tonneau adjacent the upper end thereof; braces extending from said brackets to said supports; a conveyer housing having its rear end portion disposed upon said roller and its front end portion secured in said yoke; a conveyer mechanism in said housing; a second conveyer housing, pivotally connected to an end of said first conveyer housing, and extending downwardly therefrom; a conveyer mechanism in said second housing; and means to operate said conveyers including a shaft rotatably supported by said brackets, a pulley mounted upon said shaft and extending partly through said tonneau, a second pulley carried by said chassis below said tonneau, and a belt connecting said pulleys and extending through said tonneau.

4. In a conveyer, adapted to be mounted upon a vehicle having a chassis and a tonneau, an upwardly-extending telescoping support; means to secure the lower end thereof to the outer face of said tonneau at an end thereof; a second upwardly-extending telescoping support; means to secure the lower end of said second support to said chassis, intermediate the ends thereof; a roller carried by said first support; a yoke carried by said second support; a pair of brackets secured to said tonneau adjacent the upper end thereof and adjacent opposite sides thereof; braces extending from said brackets, and across said tonneau to said supports; a conveyer housing having its rear end portion disposed upon said roller and its front end portion secured in said yoke; a conveyer mechanism in said housing; a second conveyer housing, pivotally connected to an end of said first conveyer housing, and extending downwardly therefrom; a conveyer mechanism in said second housing; and means to operate said conveyers including a shaft rotatably supported by said brackets.

5. In a power-driven conveyer adapted to be carried by a vehicle having a chassis and a body portion extending above said chassis, a pair of telescoping spaced-apart supports extending upwardly above said chassis, at one side of said body portion; a roller carried at the upper end of one of said supports with its axis of rotation normal to the longitudinal axis of said vehicle; a conveyer housing having one end portion disposed upon said roller; and means carried by the other of said supports for clamping the other end portion of said housing to said other of said supports.

6. In a power-driven conveyer adapted to be carried by a vehicle having a chassis and a body portion extending above said chassis, a pair of spaced-apart supports extending upwardly above said chassis, at one side of said body portion; a pair of spaced-apart brackets secured to the upper portion of said body portion adjacent the sides thereof, a plurality of braces extending from said brackets to said supports; a conveyer housing carried by said supports; a conveyer mechanism within said housing; and means to operate said mechanism, including a shaft rotatably carried by said brackets and extending transversely across said body portion, a pulley mounted upon said shaft, a second pulley below said first pulley, and a belt connecting said pulleys.

7. In a power-driven conveyer adapted to be carried by a vehicle having a chassis and a body portion extending above said chassis, a pair of spaced-apart supports extending upwardly above said chassis, at one side of said body portion; a pair of spaced-apart brackets secured to the upper portion of said body portion adjacent the sides thereof, a plurality of braces extending from said brackets to said supports; a conveyer housing carried by said supports; a conveyer mechanism within said housing; and means to operate said mechanism partly carried by said brackets.

8. In a power-driven conveyer adapted to be carried by a vehicle having a chassis, first and a second telescoping, spaced-apart supports extending upwardly above said chassis; a roller carried at the upper end of said first support, with its axis of rotation normal to the longitudinal axis of said vehicle; a conveyer housing extending longitudinally of said chassis and having one end portion disposed upon said roller; and means carried by said second support for detachably securing said housing thereto against longitudinal and transverse shifting of said housing.

VALDEMAR JORGENSEN.